Nov. 29, 1949     B. F. KENYON     2,489,646
AUTOMATIC FEATHERING AND NONSTALLABLE FORCE DRIVE

Filed June 16, 1947     2 Sheets-Sheet 1

INVENTOR
BERTRAND F. KENYON
BY Liverance and
Van Antwerp
ATTORNEYS

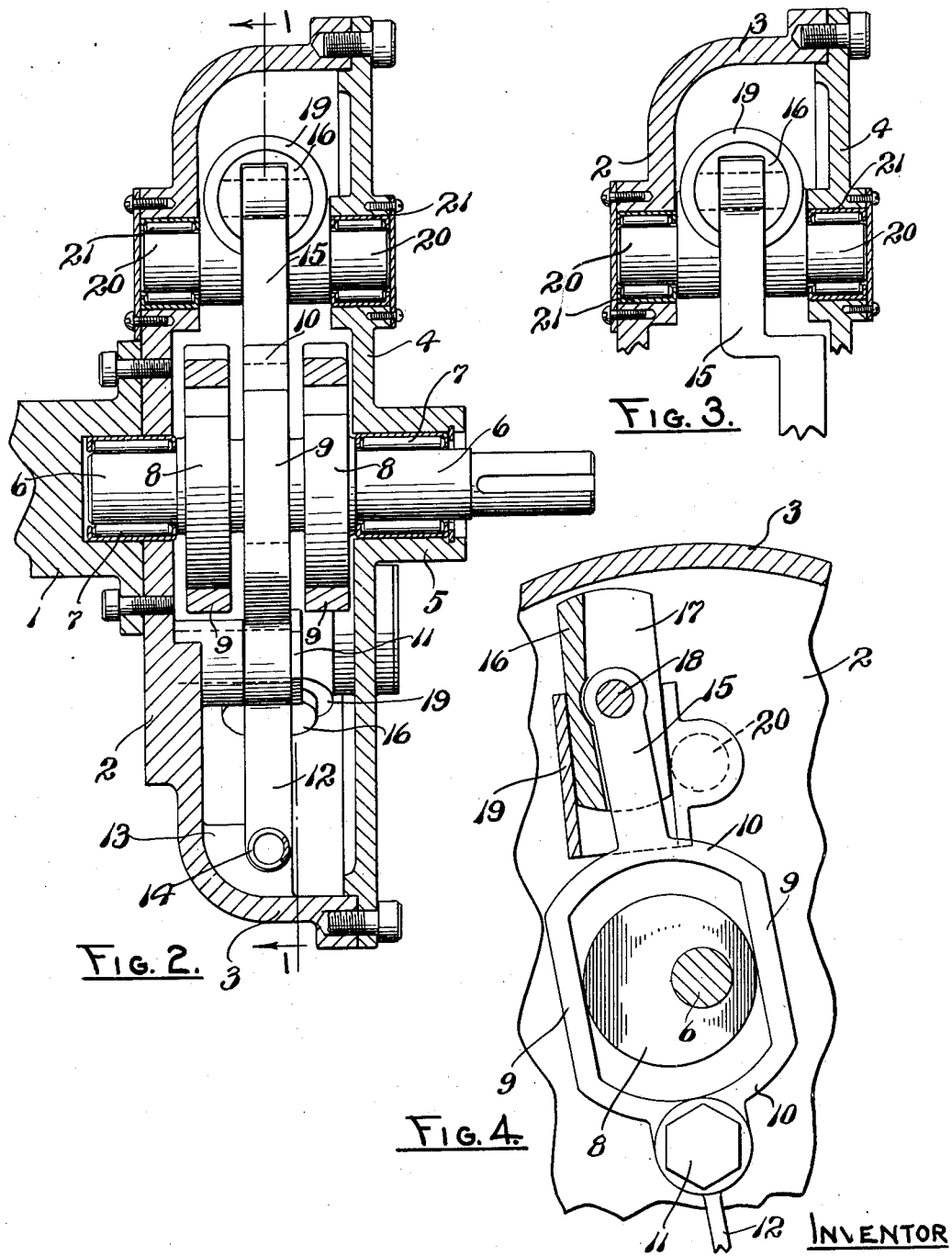

Patented Nov. 29, 1949

2,489,646

UNITED STATES PATENT OFFICE 2,489,646

AUTOMATIC FEATHERING AND NON-STALLABLE FORCE DRIVE

Bertrand F. Kenyon, Grand Rapids, Mich., assignor to Albert G. Dickinson, Grand Rapids, Mich.

Application June 16, 1947, Serial No. 754,933

7 Claims. (Cl. 74—64)

1

This invention is directed to a novel automatic feathering and non-stallable drive for the driving of a driven member from a power supplied driving member, the driving member being driven at times at different speeds of rotation. The driving of the driven member thereby is without the employment of friction surfaces or liquid, as in hydraulic drives, and without producing heat or causing loss of torque, and at the same time the power which moves the driving member is connected to the load associated with the driven member, with an automatic feathering, whereby with the driving member turning at its speed of rotation and the driven member at rest, the driven member may be brought to the same speed of rotation, with a progressive increase of speed from standing to its maximum rotation, the structure feathering against either abrupt or too fast a pick-up of revolution between the driving and driven members. The present drive is controllable as to the amount of the centrifugal force delivered to the driving from the driven member regardless of the amount of speed or force built up; and particularly when used in connection with devices as disclosed in my application Serial Number 754,932, filed June 16, 1947, of even date herewith.

It is an object and purpose of the present invention to provide a very practical, durable and economically produced connecting structure between rotatable driving and driven members of the character stated, making use of weights, the force of which remains constant as to structure and varied only with variations of speed.

An understanding of the invention may be had from the following description, taken in connection with the accompanying drawings, in which, Fig. 1 is a transverse vertical section through the gyro-force unit, substantially on the plane of line 1—1 of Fig. 2, looking in the direction indicated.

Fig. 2 is a vertical section at right angles to the section shown in Fig. 1, substantially on the plane of line 2—2 of Fig. 1, looking in the direction indicated.

Fig. 3 is a fragmentary vertical section similar to Fig. 2 showing a detail of structure with reference to the side members of the structure separably connected with the two end eccentrics on the driven member or shaft, and Fig. 4 is a fragmentary section similar to Fig. 1 showing a different positioning and location of the parts with respect to each other, occurring during the operation.

2

Figure 1:
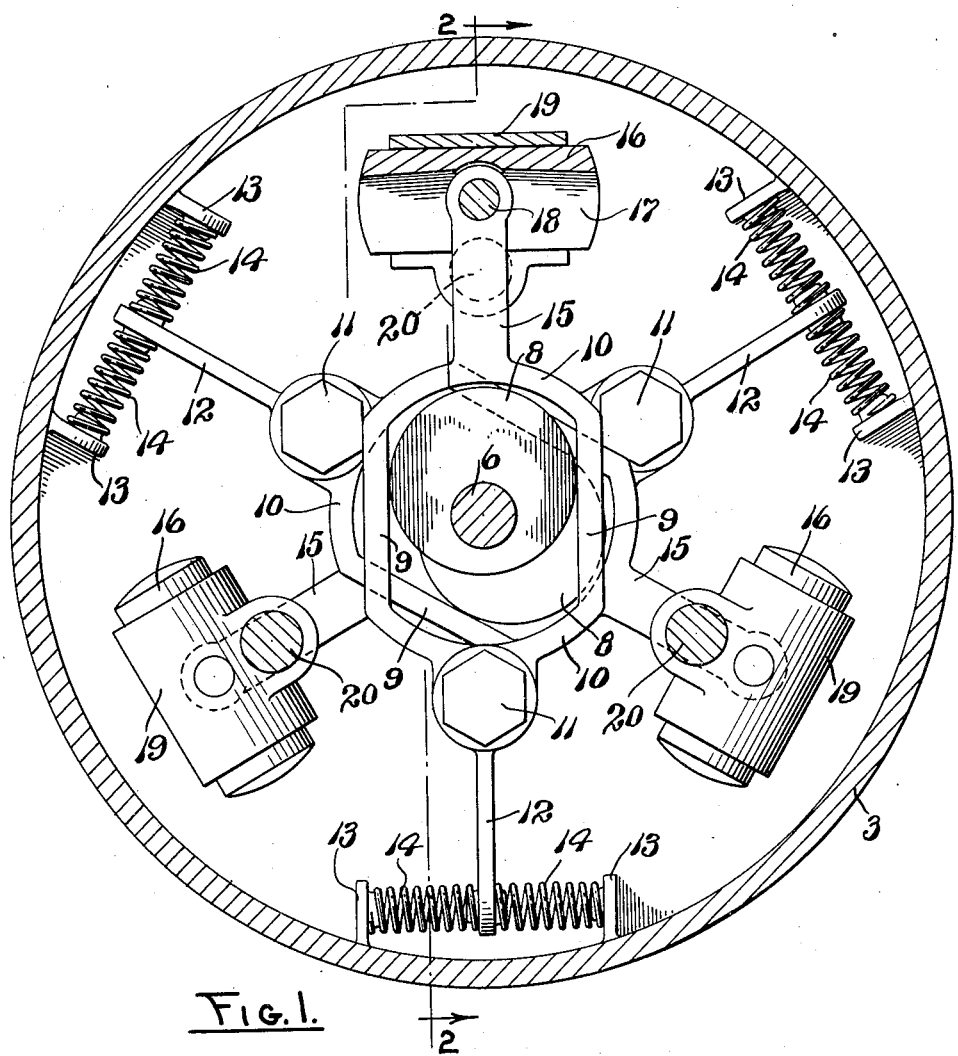

Like reference characters refer to like parts in the different figures of the drawings.

The drive member, a shaft 1, may be turned and rotated through the application of any suitable source of power at its end. As shown in Fig. 2, it has one part of a housing fixedly attached thereto, the housing including a circular front side 2 which at all edges is continued as an annular flange 3 a distance back of the plate 2. The housing is completed by a closure plate 4 at its rear side, secured thereto by cap screws or the like, centrally of which a bearing hub 5 is made.

The driven member, which is a shaft 6 in the disclosure, at its rear end portion passes through the hub 5 and is mounted in suitable anti-friction bearings 7 located within said hub. At its forward end it has a like anti-friction bearing housed within a recess therefor made through the front side 2 of the housing and extending into the driving shaft 1. On the shaft between the front and back sides of the housing, and, therefore, within the housing, a number of eccentrics 8 are located integral with or otherwise fixed with respect to the shaft 6. As shown there are three of said eccentrics spaced short distances from each other, with a middle eccentric between the others, one of which is toward the front of the housing and the other toward the rear. The eccentrics are differently located on the shaft, the longest radii of any eccentric from its outer surface to the center of the shaft 6 being disposed, in the three eccentrics 120°, apart.

Associated with each of the eccentrics is an open frame having two spaced parallel sides 9, the distance between the inner sides of which is substantially the same as the diameter of the eccentric. The ends 10, shown as of arc form have the distances between the inner sides thereof sufficient to permit the rotation of a frame around an eccentric in those parts of the operation where the eccentrics are at rest or are turning at a lesser speed of rotation than the rotative speed of the driving shaft 1.

Each of said frames is pivotally mounted for rocking movement a short distance beyond one end thereof at 11 on the housing, so that they are connected with the housing to turn therewith when it is rotated by reason of its fixed connection to the driving shaft 1. From each of said frames and extending radially outward beyond the point of pivotal connection an arm 12, on each of the frames, extends toward the annular flange 3, the outer end of each being located between the two spaced lugs or shoulders 13 formed integral with the flange 3. Relatively heavy coiled compression springs 14 are disposed one between each side of each of the arms 12 and the associated lugs 13.

From the opposite end member 10 of each frame, a second arm or connecting rod 15 extends radially outward to a weight 16 in the form of a circular rod or piston which, at its inner side, is longitudinally slotted at 17 for the end of the associated connecting rod 15 to pass therein, said rod 15 being pivotally connected to its weight 16 by a transverse pin 18. Each of the weights is slidably located within a circular sleeve 19, likewise slotted at its inner side for the passage of the associated connecting rod 15. Each of the sleeves 19, at its inner portion and at each side of the slot, has formed integral therewith downwardly extending bosses from which trunnions 20 extend horizontally outward in axial alinement with each other, mounted in roller bearings 21 in suitable openings to receive them in the front and rear sides 2 and 4 of the housing.

Upon the shaft 1 having power applied thereto to drive it, shaft 6 being at rest the housing connected with shaft 1, is turned. Similarly the sleeves 19 connected with the housing must move with it and the frames having the sides 9, rotate around their respective eccentrics 8 and are rocked upon the pivots 11. In such rocking movements the sleeves 19 are rocked about their trunnions 20 (Fig. 4), with a change of position of the weights 16 from substantially horizontal to vertical, and with a swinging from the vertical position shown in 4, back to the horizontal position in 1 and thence again to a second vertical position at the opposite side of the trunnions, continuously repeated. Such action would occur if the arms 12, lugs 13 and springs 14 were absent.

Strong forces are generated in such movements and changes of positions of the weights 16 which, transmitted to the eccentrics 8 tend to turn them and the shaft 6 with which they are integrally formed in the same direction of rotation as the shaft 1. And, depending upon the speed of rotation of the driving shaft 1, and the forces produced, shaft 6 will be progressively increased in rotation when its load resistance is overcome until the rotative speed of the shaft 6 with the eccentrics and the frames surrounding them locked against movement with respect to each other is in direct one to one ratio with that of the driving shaft 1. There is, accordingly, the automatic feathering obtained against an abrupt or too fast a pick-up of the revolution of the driven shaft 6 from standing still to the one to one driving ratio with the driving shaft 1.

The structure as described, as one of its places of use, is particularly applicable between a driven shaft and a snap-on motor, without the employment of rheostatic controls for the motor, and in any such application the arms 12 and the spring connections therewith, will not be needed and preferably will not be used. Such driving connection between the crank shaft of an internal combustion engine and the propeller shaft of an automobile, without the arms 12 and the springs associated therewith, would be defective at any such time that the engine refused to start, and the automobile was pushed from behind or towed from in front to start the engine. With the spring arrangement shown, the propeller shaft, ordinarily the driven shaft, will in that case become the driving shaft to turn over the engine crank shaft, and a connection for driving said crank shaft by the propeller shaft is provided through the medium of the arms 12 and the springs 14.

The structure described is very practical and durable and is not liable to get out of order. It is particularly economical to produce. It also may serve as a flywheel source of accumulated energy, particularly in connection with driving shafts which are in internal combustion engines; though not in any sense limited in utility to such connection with internal combustion engines, as all of the effects of a flywheel are produced whatever may be the source of power.

The invention is defined in the appended claims and is to be considered comprehensive of all forms of structure coming within their scope.

I claim:

1. In a structure as described, a driving shaft, a housing having spaced sides perpendicular to the axis of the driving shaft connected to turn therewith, a driven shaft extending through said housing having a bearing at one end in said driving shaft and extending through and beyond the opposite side of the housing and having a bearing therein, a plurality of eccentrics on the driven shaft within the housing, a plurality of spaced sleeves, equal in number to the number of eccentrics, mounted for rocking movement on and between the sides of the housing on axes spaced outwardly from and parallel to the axis of the driving and driven shafts, a plurality of weights one slidably mounted in each sleeve, a frame located around each eccentric having parallel sides bearing against diametrically opposed points of its eccentric, and a connecting rod extending from one end of each of said frames pivotally connected at its outer end, one of to each of said weights. as described.

2. A construction as defined in claim 1, each of said weights at its inner side being longitudinally slotted and each of said sleeves being similarly slotted, the pivotal connection of a connecting rod to a weight being between the ends of the weight a distance outward from the axis of turning of the sleeve in which said weight is located.

3. A construction as defined in claim 1, and an arm extending radially outward from the opposite end of each of said frames, said housing having a pair of spaced lugs for each of said arms between which the arms extend, and springs, one at each side of each of said arms between the arms and the lugs, as described.

4. In a construction as described, driving and driven rotatable members in axial alinement, a housing connected to and movable with the driving member, the driven member extending through the housing, a plurality of sleeves mounted to rock on axes spaced from each other and located outwardly from and around said driven member within the housing, said sleeves having a rocking mounting on and between the sides of the housing, a weight slidable lengthwise of and within each sleeve, a rod pivotally connected to each weight between the ends thereof and extending therefrom toward said driven member, means for pivotally mounting said rods on the housing for rocking movement, and interengaging means on said driven member and said rods for rocking said rods, and thereby slidably moving said weights in said sleeves and rocking said sleeves back and forth, upon rotation of the housing through connection thereof to the driving member.

5. In a construction as described, driving and driven shafts in axial alinement, a housing having spaced apart sides, said sides being connected together, secured to and rotatable with said driving shaft, said driving shaft being connected to one side of the housing, and said driven shaft extending through both sides of the housing and having rotatable mountings therein, a plurality of eccentrics on said driven shaft within the housing, an open frame around each eccentric, each frame having a parallel spaced side engaging its associated eccentric at diametrically opposite points, means for pivotally mounting each frame adjacent one end thereof on said housing sides, a rod extending from the opposite end of said frame in substantial alinement with the axis of said driven shaft, and the axis of the pivot of said frame, an elongated generally cylindrical weight pivotally connected at the outer end of each rod to rock about an axis parallel to the axis of the driven shaft, said pivotal connections being substantially midway between opposite ends of said weights, a cylindrical sleeve around each weight, and means for pivotally mounting each sleeve on and between the sides of the housing to rock about axes located nearer to the axis of said driven shaft than are the pivots connecting said weights to said rods.

6. A structure as defined in claim 5, each of said sleeves being slotted for its full length at the side thereof nearest the driven member for passage of its associated rod to its connected weight, and each weight being correspondingly slotted for the outer end of its connecting rod to enter said slot in the weight and for location of the pivotal connection of said weight to said rod on an axis transverse to and in the same plane with the longitudinal axis of the weight.

7. A structure as defined in claim 5, and a bar extending from each of said frames opposite to and in alinement with said rod extending from the frame, and yielding means engaging each of said bars adjacent its outer end at opposed sides thereof, each of said yielding means, at a distance from said arm, abutting and having support against said housing.

BERTRAND F. KENYON.

REFERENCES CITED

The following references are of record in the file of this patent:

UNITED STATES PATENTS

| Number | Name | Date |
|---|---|---|
| 1,269,935 | Howard | June 18, 1918 |
| 1,767,311 | Rohrbacher | June 24, 1930 |
| 1,816,808 | Berry | July 28, 1931 |
| 1,914,067 | Berlin | June 13, 1933 |
| 1,949,042 | Dodge | Feb. 27, 1934 |

FOREIGN PATENTS

| Number | Country | Date |
|---|---|---|
| 152,966 | Great Britain | Dec. 1, 1921 |
| 223,193 | Great Britain | May 19, 1924 |
| 474,190 | Great Britain | Oct. 27, 1937 |
| 622,997 | France | June 14, 1927 |
| 649,362 | France | Dec. 21, 1928 |